Nov. 29, 1966 M. M. MABRY ETAL 3,288,981
IMPLANT WELDING

Filed Feb. 3, 1965 2 Sheets-Sheet 1

INVENTORS
MILTON M. MABRY
GEORGE R. PRESCOTT
ZALMAN P. SAPERSTEIN
BY Robert O. Richardson
ATTORNEY

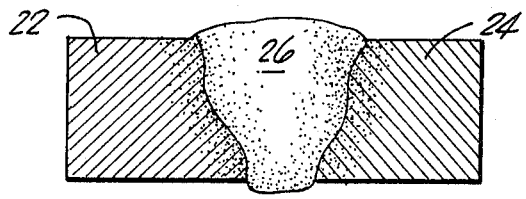
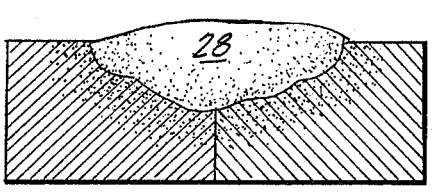
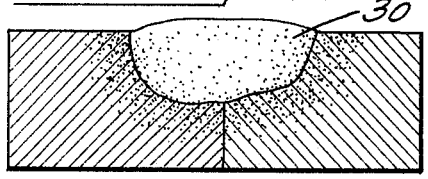
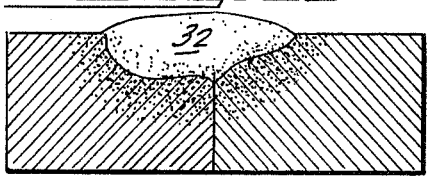
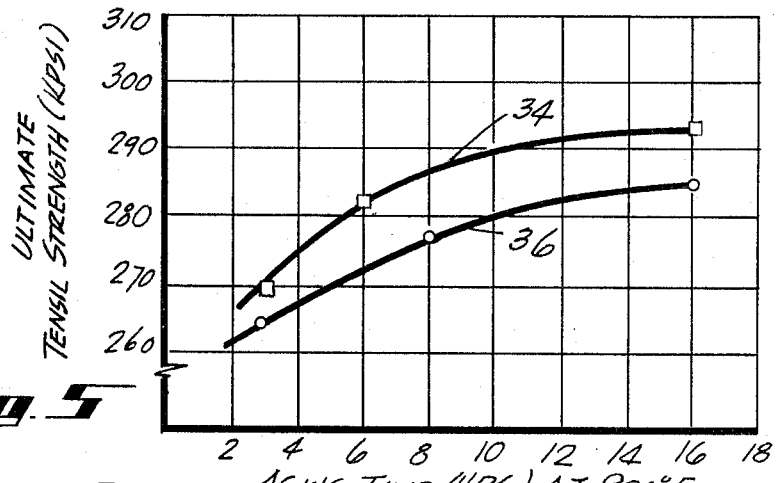
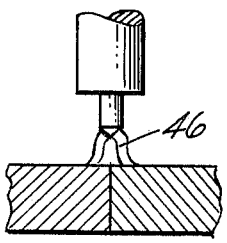
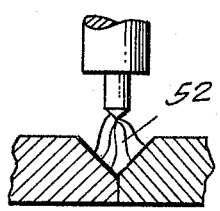
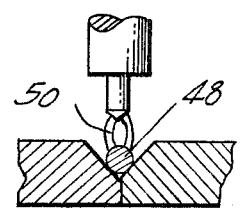
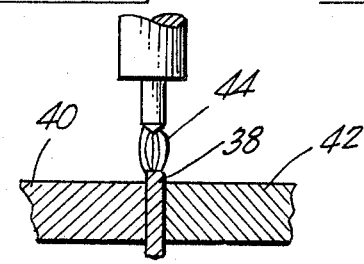

United States Patent Office 3,288,981
Patented Nov. 29, 1966

3,288,981
IMPLANT WELDING
Milton M. Mabry, Torrance, George R. Prescott, Pasadena, and Zalman P. Saperstein, Long Beach, Calif., assignors to Douglas Aircraft Company, Inc., Santa Monica, Calif.
Filed Feb. 3, 1965, Ser. No. 430,027
4 Claims. (Cl. 219—137)

This invention relates to implant welding and more particularly to a technique of inserting a material into a weld joint prior to welding to control chemical, mechanical and physical properties of the weld deposit.

A problem occurs in welding together sections of material having a wall thickness at their abutting edges greater than a certain maximum thickness through which acceptable welding can be accomplished. The application of heat to the outside surface to achieve a welding thereof would not provide sufficient penetration of fusion of the metal in the two sections. Thus, a weld would not occur throughout the thickness. One solution to the problem is to cut down the thickness of the sections along their abutting edges, whereby they will be thin enough for a complete weld to be made throughout remaining thickness in the initial welding pass. For subsequent welding passes, the sections are built up to their original thickness with weld metal supplied by electrodes or welding rods of suitable composition.

This method of welding thicker sections has obvious disadvantages. It is time-consuming and requires more steps in accomplishing the weld. Heating and cooling rate tolerances must become more critical in order to avoid microcracking failures. The welding buildup across a wider gap in the subsequent welding passes must be of the quality to insure adequate weld strength.

The implant welding technique of the present invention represents a novel method of obtaining deeper penetration welds in a give thickness of material at comparatively low arc energy input. The implant method produces welds that possess depth to width ratios greater than that obtainable with conventional electric arc fusion processes alone. The now deeper welds also possess superior strength. With the proper selection of the implant material the implant method may be used to control the weld deposit composition and mechanical properties.

Implant welding is a process which incorporates a preplaced insert in a weld joint for the purpose of obtaining specific chemical and mechanical properties and to control the weld depth to width ratio. The implant is melted and fused into the weld deposit, using conventional welding arc heat sources, well known in the art. Filler material may be added, if needed, using conventional methods. It has been found that with implant welding, the welding arc stabilizes better and an intensification of the arc plasma (high energy welding gases) results.

It is therefore an object of the present invention to increase joint strength by the provision of a method for obtaining greater depth of penetration to weld width ratios.

Another object is to provide for a method of welding thicker sections using fewer weld passes than heretofore possible.

Another object is the provision of an implant welding method which extends the usefulness and applicability of conventional metal inert gas and tungsten inert gas processes.

A further object is the provision of a welding method in which simplified joint preparations may be used.

A further object is the provision of a welding technique having greater penetrating power for joining thick plate material with fewer welding pass operations than heretofore possible.

Another object is the improvement in the control of arc stability and reduction of arc diameter by focusing and constricting the diameter of the arc with various implant materials, thereby increasing the arc current density.

Other objects and benefits to be derived from the practice of the present invention will become apparent as a description of the invention proceeds, having reference to the drawings in which:

FIGURES 4A–4D are cross-sectional views showing a comparison of several species of implant welds with a regular non-implant weld specimen;

FIGURE 5 is a graph showing the relative tensile strength of implant and non-implant welds;

FIGURES 6A and B are schematic illustrations showing the comparison of a regular butt joint arc pattern with a foil implant arc pattern; and FIGURES 7A and B symbolic illustrations showing the relationship between a regular butt groove arc pattern and a wire implant arc pattern.

Figure 1:
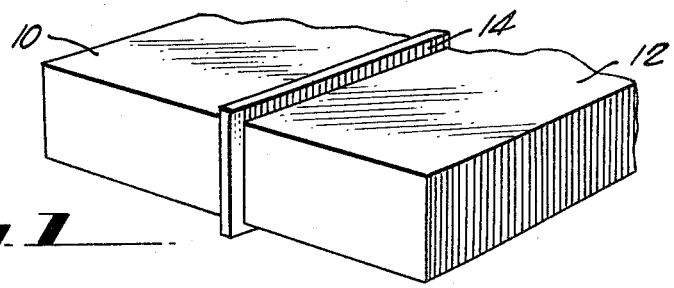
FIGURE 1 is a perspective view showing a square butt type of function using a foil implant.
Figure 2:
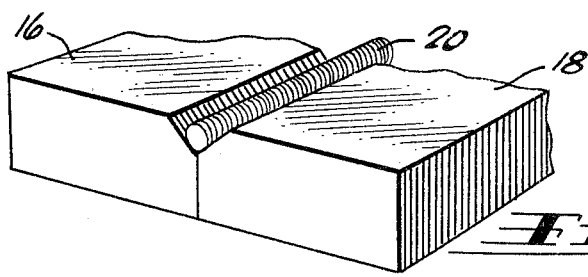
FIGURE 2 is a perspective view showing a beveled butt joint illustrating a wire implant.

Referring now to FIGURE 1 there is shown two metal sections 10, 12 to be welded together. Sandwiched between the abutting ends is a titanium foil implant 14. Similarly, there is shown in FIGURE 2, two sections 16, 18 of material to be welded. The abutting ends have a beveled butt joint to receive a wire implant 20. These pieces are ready to be welded.

The following table illustrates typical alloys that may be welded, using the implant method, with thicknesses ranging from 0.075 inch thick to ¾ inch thick.

TABLE 1
[Chemical analysis of parent material weight percent]

| Element | 0.075 Inch Maraging HT #W-24252 18Ni—9Co—5Mo | 0.25 Inch Cor-Ten (Nominal) | 0.25 Inch Maraging HT #24349 | 18Ni—7Co—5Mo |
|---|---|---|---|---|
| Nickel | 18.68 | 0.30 Max. | 18.53 | +17.83 |
| Cobalt | 8.97 | | 8.89 | 7.41 |
| Molybdenum | 5.07 | | 4.64 | 4.70 |
| Titanium | 0.72 | | 0.69 | 0.46 |
| Manganese | 0.011 | 0.20/0.50 | 0.021 | 0.04 |
| Carbon | 0.019 | 0.12 Max. | 0.030 | 0.02 |
| Phosphorus | 0.004 | 0.07/0.15 | 0.003 | 0.004 |
| Sulfur | 0.010 | 0.05 Max. | 0.010 | 0.009 |
| Nitrogen | 0.003 | | 0.0048 | |
| Silicon | | 0.25/0.75 | 0.060 | 0.08 |
| Aluminum | | | 0.150 | |
| Zirconium | | | 0.006 | |
| Calcium | | | 0.005 | |
| Copper | | 0.25/0.55 | | 0.05 |
| Chromium | | 0.30 Max. | | 0.01 |
| Iron | Balance | Balance | Balance | Balance |

Implant materials have included commercially pure titanium, type 1100 aluminum and 18Ni—9Co—5Mo alloy. In addition to using titanium, cobalt or aluminum as implant materials or filler wire, powdered compounds may also be used. For example, calcium chloride, sodium silicate, potassium nitrate, lithium borate, sodium carbonate, and potassium chloride, all of technical grade quality have been successful.

It has been found that the specimens welded with the implanted titanium foil possessed higher tensile properties than specimens welded with parent metal filler wire. The tensile failures of the specimens welded with filler wire occurred through the weld metal whereas the tensile failures of the implanted welds occurred through heat effected regions in the sheet material itself. The higher the titanium content in the implant material the lower was the required welding amperage. It was also noted that the weld bead was smaller in width.

Figure 3:
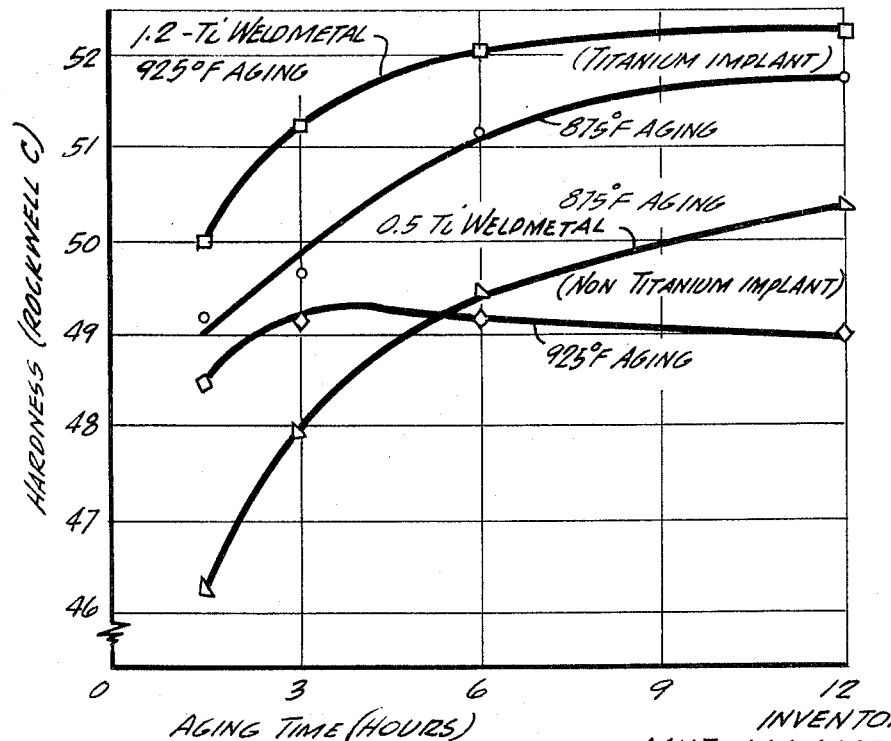
FIGURE 3 is a graph showing the relationship of titanium implant welds with non-implant welds concerning hardness and aging.

FIGURE 3 shows the effect upon hardness of titanium implants in welding maraging steel as compared to non-titanium welds under two different aging temperatures. At both aging temperatures it is apparent that the titanium implant welds are much harder than the non-implant welds.

In FIGURES 4A–4D there is shown the effect of implant on penetration. In these views 0.25 inch or Cor-Ten (analysis in Table 1) sheets 22, 24 are welded with a titanium wire implant (FIGURE 4A), aluminum implant (FIGURE 4B), 18Ni—9Co—5Mo implant (FIGURE 4C), and no implant (FIGURE 4D). Upon inspection of the different welds 26, 28, 30 and 32 the titanium implant is superior in penetration.

In FIGURE 5 is shown a graph relating the ultimate tensile strength to the aging time in welding maraging steel, using titanium implant welds and regular non-implant welds. As shown by line 34, at all aging times the titanium implant welds have superior tensile strength to that of the non-implant welds as shown by line 36.

Upon discovery that less amperage is required in welding when implant materials are used, it was then found that various implant materials focus and constrict the diameter of the arc, thereby increasing the arc current density. This allows the energy of the arc in the form of heat to be concentrated on a smaller service area of the plate. This concentrated energy causes greater penetration and reduces the width of the fusion and heat effect zones, as shown schematically in FIGURES 6A, 6B, 7A and 7B. In FIGURE 6B the presence of implant material 38 between sheets 40, 42 reduces the diameter of arc 44 compared to arc 46 shown in FIGURE 6A. Similarly, the presence of filler wire 48 in FIGURE 7B constricts arc 50 compared to arc 52 shown in FIGURE 7A.

The following table illustrates the mechanical properties of ¾" thick, 18Ni—7Co—5Mo (composition shown in Table 1) specimens made with and without a titanium implant. As can be seen, the use of titanium implants results in a stronger weld.

TABLE 2

| Type of Implant | 0.2% Yield Strength, K.s.i. | Ultimate Tensile Strength, K.s.i. | Percent Elongation 1 inch Gage |
| --- | --- | --- | --- |
| None | 232.8 | 246.6 | 6.5 |
| 1/16" dia. A55 Titanium Wire | 236.0 | 252.5 | 6.0 |
| 3/32" dia. Titanium Wire | 236.0 | 261.2 | 8.0 |

There are several advantages of the implant welding technique over presently known processes. For example, greater penetration with less energy input can be obtained than with the conventional metal inert gas or tungsten inert gas welding processes. The fusion and heat ayected zones will be smaller, improving joint efficiency and minimizing hot cracking under restraint. In thick plate where multi-pass welds are required the implant method will reduce the number of passes required. The subsequent points summarize the potential advantages and uses of implant welding resulting from this invention.

(1) The implant method can be used to control the weld deposit chemistry and hence mechanical properties.

(2) Implant welding extends the usefulness and applicabilty of conventional arc welding processes.

(3) Thicker sections may be welded using fewer passes without loss of mechanical properties.

(4) Greater depth-to-width ratios can be attained with implants.

(5) Significant improvement in arc stabilization and reduction in arc blow or arc wandering are accomplished.

(6) Increases in arc current density are possible, making a more efficient heat source.

Having thus described the present invention, it is to be understood that after an understanding thereof one skilled in the art can envision various modifications and improvements, all of which are intended to be embraced by the present invention within the scope of the present invention as defined by the appended claims.

We claim:

1. A method of obtaining deeper weld penetration, i.e., increased weld depth-to-width ratios, by selectively choosing an implant material from a group having the quality of modifying the arc plasma energy distribution to achieve deeper welding penetration, said group consisting of commercially pure titanium, cobalt, aluminum, and 18Ni—9Co—5Mo alloy and technical grade quality of calcium chloride, potassium nitrate, lithium borate, and sodium carbonate, placing said implant material in contact with portions of material to be welded, and thereafter welding said portions together.

2. A method of obtaining deeper weld penetration, i.e., increased weld depth-to-width ratios, by selectively choosing an implant material from a group having the quality of modifying the arc plasma energy distribution to achieve deeper welding penetration, said group consisting of commercially pure titanium, cobalt, aluminum, and 18Ni—9Co—5Mo alloy and technical grade quality of calcium chloride, potassium nitrate, lithium borate, and sodium carbonate, placing said implant material between abutting portions of material to be welded, and thereafter welding said portions together.

3. A method of obtaining deeper weld penetration comprising the steps of placing an implant material of titanium between portions of material to be welded, and thereafter welding said portions together.

4. The method of obtaining a deeper weld penetration comprising the steps of placing an implant material between portions of material to be welded, and thereafter welding said portions together, said implant material being from a group consisting of commercially pure titanium, cobalt, aluminum, and 18Ni—9Co—5Mo alloy and technical grade quality of calcium chloride, potassium nitrate, lithium borate, and sodium carbonate.

References Cited by the Examiner

UNITED STATES PATENTS

| | | | |
| --- | --- | --- | --- |
| 1,275,412 | 8/1918 | Figgins | 219—146 X |
| 1,374,711 | 4/1921 | Armor | 219—146 |
| 1,604,181 | 10/1926 | Lincoln | 219—137 |
| 1,884,714 | 10/1932 | Jerabek | 219—137 |
| 2,170,019 | 8/1939 | Gaylord | 219—137 |
| 2,691,214 | 10/1954 | Schnell et al. | 29—482 |
| 3,069,534 | 12/1962 | Peck | 219—137 |

RICHARD M. WOOD, *Primary Examiner.*

ANTHONY BARTIS, *Examiner.*